US008862276B2

(12) United States Patent
Schmidt et al.

(10) Patent No.: US 8,862,276 B2
(45) Date of Patent: Oct. 14, 2014

(54) METHOD AND APPARATUS FOR THE AUTOMATIC REGULATION OF THE IRRIGATION OF PLANTS

(75) Inventors: Walter Schmidt, Russikon (CH); Yucel Toprak, Zurich (CH)

(73) Assignee: Plantcare AG, Russikon (CH)

( * ) Notice: Subject to any disclaimer, the term of this patent is extended or adjusted under 35 U.S.C. 154(b) by 296 days.

(21) Appl. No.: 13/062,223

(22) PCT Filed: Aug. 19, 2009

(86) PCT No.: PCT/CH2009/000274
§ 371 (c)(1),
(2), (4) Date: May 23, 2011

(87) PCT Pub. No.: WO2010/025573
PCT Pub. Date: Mar. 11, 2010

(65) Prior Publication Data
US 2011/0238226 A1 Sep. 29, 2011

(30) Foreign Application Priority Data
Sep. 5, 2008 (CH) ........................................ 1425/08

(51) Int. Cl.
G05D 11/00 (2006.01)
G05D 11/02 (2006.01)
G05B 11/01 (2006.01)
G05B 19/18 (2006.01)
H01H 45/00 (2006.01)
A01G 27/00 (2006.01)
A01G 25/16 (2006.01)

(52) U.S. Cl.
CPC .................................. *A01G 25/167* (2013.01); *A01G 27/003* (2013.01)
USPC ................ 700/284; 700/14; 700/63; 307/118

(58) Field of Classification Search
CPC ...................................................... A01G 25/16
USPC ................ 700/284, 63, 14; 307/118; 137/78; 239/70
See application file for complete search history.

(56) References Cited

U.S. PATENT DOCUMENTS

| 3,553,481 | A | * | 1/1971 | Hasenbeck | ................... 307/118 |
| 4,922,433 | A | * | 5/1990 | Mark | ........................... 700/284 |
| 5,021,939 | A | * | 6/1991 | Pulgiese | ........................ 700/14 |
| 5,207,380 | A | * | 5/1993 | Harryman | ...................... 239/64 |
| 6,267,298 | B1 | * | 7/2001 | Campbell | ....................... 239/70 |
| 6,314,340 | B1 | | 11/2001 | Mecham et al. | |

(Continued)

FOREIGN PATENT DOCUMENTS

| FR | 2735328 | 12/1996 |
| GB | 2281419 | 3/1995 |
| WO | 2006081693 | 8/2006 |

*Primary Examiner* — Mohammad Ali
*Assistant Examiner* — Ziaul Karim
(74) *Attorney, Agent, or Firm* — Rankin, Hill & Clark LLP

(57) ABSTRACT

A method for the automatic irrigation of plants, wherein the temporal progression of soil moisture is determined from measured soil moisture values, and said progression is used for the calculation of an optimized irrigation time duration, such that both water excess in the soil and soil drying are avoided as much as possible. Preferably, the time duration of irrigation is constantly evaluated and optimized using comparisons of measured values with prespecified moisture- and dryness threshold values (GWmoist, GWdry), and automatically adjusted to changing environmental conditions and/or plant requirements.

21 Claims, 2 Drawing Sheets

(56) References Cited

U.S. PATENT DOCUMENTS

| | | | |
|---|---|---|---|
| 6,975,245 B1 * | 12/2005 | Slater et al. | 340/870.16 |
| 7,203,576 B1 * | 4/2007 | Wilson et al. | 700/284 |
| 7,349,764 B2 | 3/2008 | Haupt | |
| 7,584,023 B1 * | 9/2009 | Palmer et al. | 700/284 |
| 7,836,910 B2 * | 11/2010 | Dresselhaus et al. | 137/78.3 |
| 2004/0083833 A1 * | 5/2004 | Hitt et al. | 73/866 |
| 2010/0030476 A1 * | 2/2010 | Woytowitz | 702/3 |

\* cited by examiner

METHOD AND APPARATUS FOR THE AUTOMATIC REGULATION OF THE IRRIGATION OF PLANTS

BACKGROUND OF THE INVENTION

1. Field of the Invention

The invention relates to an apparatus and a method for the automatic regulation and control of an irrigation of plants in accordance with the preamble of the independent patent claims. It relates, in particular, to an apparatus and a method for an optimized irrigation time without water excess and without the soil drying out.

2. Description of Related Art

When plants are irrigated, in particular lawns or agricultural land, use is made of irrigation systems that are controlled by a timer. The user can set, on the latter, both the instant and the duration of the irrigation, there being on the market various timers for the control of a variety of irrigation zones and with different levels of complexity.

This type of irrigation control is low in flexibility, that is to say irrigation is performed over the preset time duration and at the preset instants, irrespective of the effective need of the plants that are to be irrigated.

So-called rain sensors are also known that, when rain is falling, measure the amount of rain and block the timer when a defined amount is exceeded so that no irrigation is performed while it is raining.

It is true that this method avoids an irrigation during or after a rain event. For example, in cool or rainless weather irrigation is performed, however, though sufficient moisture is present in the soil and there is thus no need to irrigate.

In recent years, soil moisture sensors have been connected to timers. These sensors measure the current moisture in the soil and enable the timer, and thus initiate watering, only upon falling below a critical soil moisture that can be set. Most of these soil moisture sensors are expensive to procure and maintenance-intensive, and the measurement result depends strongly on other parameters, such as the fertilizer content. They have therefore not been able to establish themselves on the market. However, a novel soil moisture sensor that does not have these disadvantages has also been developed in accordance with WO 2006/081693.

Such an improved soil moisture sensor can now be used to prevent irrigation from being performed unnecessarily. However, the amount of water administered per watering cycle is still set by the user on the timer, and is therefore fixedly prescribed. The amount of water effectively required can, however, deviate strongly from the set amount, and it also varies with short term and long term climatic fluctuations. Experience shows that in the case of crops, in particular, once a watering time has been set, users tend to adapt to the current climatic conditions only in exceptional cases and mostly not change it throughout the entire year.

When consideration is given to the ever more topical problems associated with rising water consumption, particularly in countries with scarce water reserves, the aspect of carefully managing water as a resource becomes very important. The avoidance of unnecessary water consumption belongs here, as well. Immense quantities of water (80% of the entire water consumption) are used globally in the irrigation of crops and green areas. It is estimated that half thereof could be saved by intelligent irrigation.

It is therefore an object of the invention to provide an intelligent method for the control and regulation of an irrigation time with the aid of which, with an automatically set watering time, no excess water is poured and, on the other hand, the soil is prevented from drying out.

BRIEF SUMMARY OF THE INVENTION

The object is achieved by the method according to the invention as it is described in the patent claims. The invention also includes an apparatus with the aid of which the method can be carried out, and an electronic regulation that can be installed in an appropriate apparatus.

The method relates to an intelligent method for the control of irrigation that, on the one hand, is capable of automatically fixing an irrigation time such that no excess of water is poured. On the other hand, the soil is also prevented from drying out. The method is also capable of automatically compensating short term, medium term and long term temperature changes such as occur in the course of a year, preferably in such a way that an optimum amount of water is always poured even without manual intervention. When crops are irrigated they also require more and more water with increasing size and/or leaf area. The inventive method takes account of application specific conditions such as system parameters and environmental parameters, and is also capable of automatically compensating an increase in demand as described.

The method is based on a novel evaluation of the soil moisture time profile measured by a soil moisture sensor. In particular, the soil moisture sensor described in WO 2006/081693 can be used to this end. However, it is also possible to use any arbitrary soil moisture sensor that permits electronic measurement of moisture values. A sensor is then combined with the inventive electronic regulation and/or appropriate evaluation electronics, for example in the form of a chip.

The soil moisture is repeatedly measured with the aid of a soil moisture sensor and appropriate evaluation electronics in the method for the regulation and control of an automatic irrigation device. The time profile of the soil moisture is analyzed in this case before and after an irrigation operation, and an irrigation time is calculated from a moisture value before irrigation and a moisture value after an irrigation. A system specific characteristic K is considered in the calculation of the irrigation time, said characteristic preferably being determined in an initial calibration measurement and checked and adapted in subsequent measuring steps.

The regulation of the inventive apparatus is preferably designed such that even when environmental conditions and plant size change, on the one hand the plant is always supplied sufficiently with moisture, but on the other hand not too much water seeps unused into the soil.

A moisture scale used in this case has two limit values that can be set: in the direction "dry", the limit value that sets a minimum moisture, and the limit value that sets a maximum moisture are defined by an input from the user. In the direction of higher moisture, a further limit value "wet" is reached when the soil is saturated with water. This limit value is defined in advance, that is to say is system-induced, for a sensor in use, because a sensor cannot become wetter than wet. An aim of the control is now, on the one hand, not to fall below the limit value for "dry" excessively, including over a lengthy time, so that the plants do not suffer drought damage and are not exposed to drought stress. On the other hand, however, it is also important that the limit value for "moist", which corresponds at most to that of "wet", be reached only for a short time, because additional water would seep away and could not be used by a plant.

In order that the local conditions relating to soil composition as well as to water ingress per unit area are taken into account from the start in a regulation, at the beginning of the method, this is, as a rule, at the start of an irrigation period, preferably a calibration measurement is carried out. In this case, a soil moisture sensor is introduced into a soil to be irrigated. It is preferably inserted to a specific depth. This depth is dependent on the position of the roots and lies in a preferred range of 5-30 cm. Irrigation is then performed briefly, preferably by an existing sprinkler or a drip fed irrigation. Depending on the soil permeability, this irrigation will be detected earlier or later by an increase in the moisture content at the sensor. The time covered up to this detection is, on the one hand, a measure of the permeability of the soil but also, on the other hand, of the water ingress at the location of the sensor.

The ratio of the difference in moisture value before the irrigation and moisture value after the irrigation to the time of the irrigation can be regarded as a user specific characteristic K. K takes account both of the local soil composition and of the installed irrigation performance. The characteristic K tells us by how much a moisture value changes when pouring is performed over a specific time, for example one minute, and with a specific amount of water. This factor K is determined automatically during the calibration step initially carried out, this corresponding in essence to a first measurement, and is used for the further measurements. It would also be possible to input an initial value of K, for example in accordance with empirical values, in advance. A subsequent regulation adapts the characteristic as appropriate to the prescribed moisture limit values.

In a preferred embodiment of the method, the characteristic K is repeatedly checked, preferably cyclically, it also being possible for an irrigation to be performed cyclically. In this case, K is compared, preferably after a measurement that is performed after an irrigation, with an upper limit value that corresponds to a moist soil. Depending on the desired/actual value deviation, K is enlarged or reduced by a factor. Since K is inversely proportional to the irrigation time in the present calculations, a reduction of K is apposite when the irrigation time is to be lengthened, that is to say when, for example, a measured moisture value has not reached an upper moisture limit value after an irrigation. An enlargement of the characteristic K that therefore leads to a reduced calculated irrigation time is apposite when an upper limit value "moist" is reached after the irrigation, but the aim is to prevent this limit value from being exceeded too far. It is preferred to choose a moisture value below a moisture limit value for a completely wet soil as an upper limit value. It is also possible thereby to determine an exceeding of the limit value.

In practice, an upper limit value that defines a water saturated state corresponds to that soil moisture for which the soil is saturated with water so far that no more water seeps into the subsoil because of gravity. This property of the soil is denoted as field capacity ($GW_{FK}$). Sandy soils have a low field capacity, while soils with a high proportion of organic materials such as peat or humus have a high field capacity. Such a moisture limit value based on the field capacity can therefore lie below a limit value for a "wet" soil.

The calibration operation described above can also be used to determine such a field capacity automatically. To this end, irrigation is continued after the characteristic K has been determined over a lengthy time, for example 1-2 hours. It is to be ensured that the soil is supersaturated. After a lengthy waiting time, for example of 2-12 hours, it can be assumed that the excess water has run off into the subsoil. The moisture value is then determined again and this corresponds to the field capacity $GW_{FK}$, and can be stored in the system. When there is a manual input of an upper limit value "moist" that overshoots the $GW_{FK}$, the user can now be alerted to this circumstance, for example by an alarm report. It would also be possible for the upper limit value "moist" to be set automatically to the moisture value corresponding to the field capacity.

In a further embodiment of the method, an irrigation time calculated automatically with a characteristic K is increased or decreased directly by a factor D, that is to say by an amount of water given in a prescribed irrigation device. Such a fixed supply or removal of water determined by concrete measurements can be advantageous when, for example, agricultural land is to be kept wet or moist or less moist over a somewhat longer time. In the case of a calculated irrigation time, an amount of water is optimized to an optimum relationship between saving water and drying out. However, a customary moisture sensor cannot be used to distinguish between wet, somewhat too wet or much too wet. A higher supply of water through a change in the characteristic K can elude accurate monitoring. If the aim is now to keep an area moist or wet or less moist over a somewhat lengthy time, this can be achieved by the supply of, or reduction by a defined amount of water. With certain limitations, this can also be achieved by reducing or decreasing the moisture limit values.

An exceeding of a maximum amount of water on purpose, that is to say an exceeding of the amount of water that is sensible in accordance with a field capacity $GW_{FK}$, can, for example, be apposite when, by way of example, the aim is to prevent the soil from being salted. An excess of water ensures that the salt cannot accumulate in the critical root area.

BRIEF DESCRIPTION OF THE DRAWINGS

Different stages and aspects of the method, as well as preferred embodiments of the method, are explained in more detail below with the aid of exemplary figures. In the drawing.

DETAILED DESCRIPTION OF THE INVENTION

Figure 1:
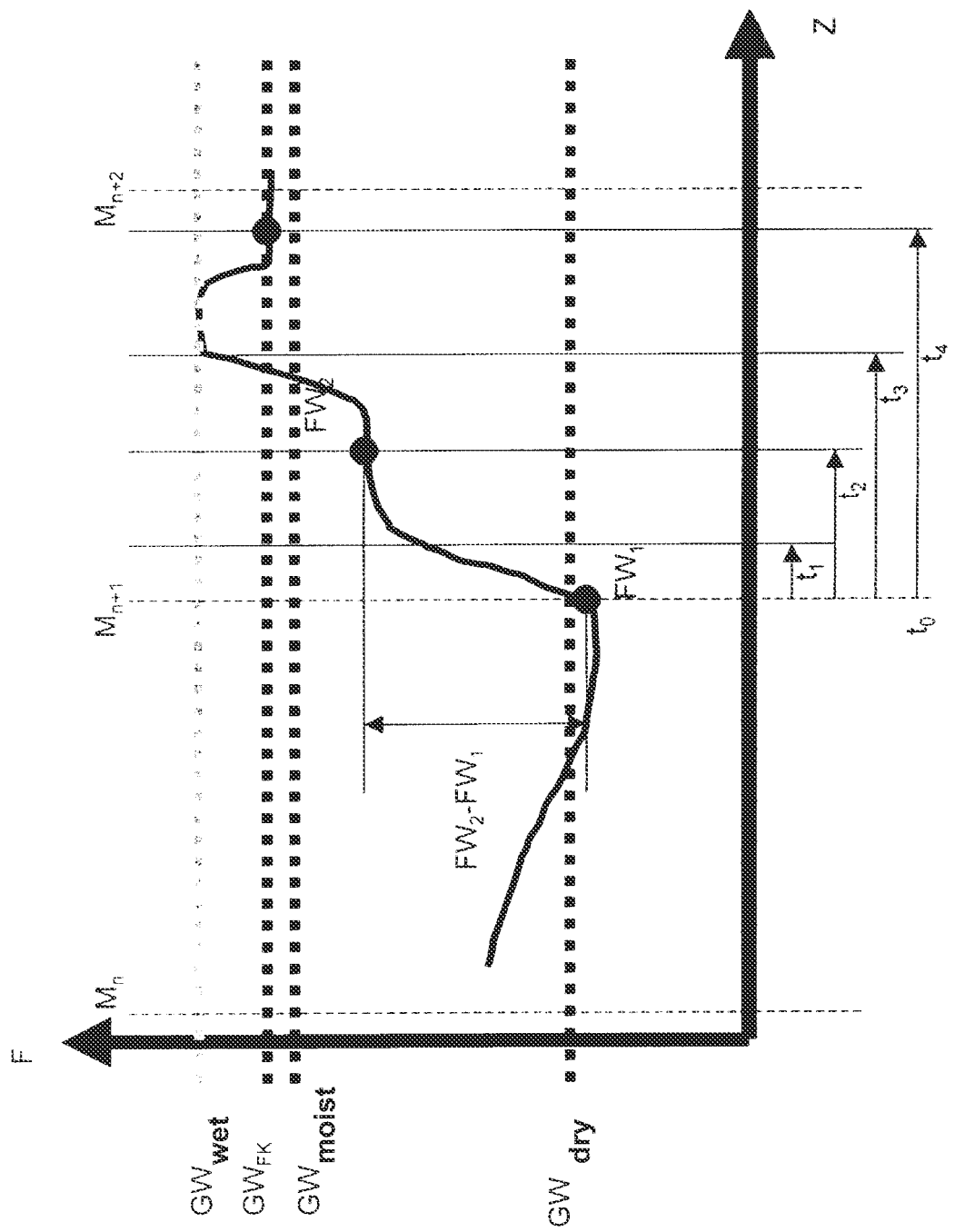
FIG. 1 shows the calibration measurement and the determination of the field capacity.

The graph in FIG. 1 shows the profile of the moisture level F against time Z. The soil moisture content is measured at regular intervals Mn, Mn+1, Mn+2 .... At the instant Mn, the soil moisture content is still above a set limit value GWdry that corresponds to a minimum soil moisture that is to be reached. At the instant of the following measurement Mn+1 at the instant t0, the soil moisture content, the first moisture value $FW_1$, is below the set limit value GWdry. An irrigation operation is correspondingly initiated and terminated at the instant t1. The instant t1 or the irrigation time t1−t0 is preferably selected to be very short, for example 5 min., for a calibration measurement, in order to reliably prevent over-irrigation. At a second instant t2, a control measurement, for example approximately ½ hour after the irrigation, is carried out, and a further moisture value $FW_2$ is measured. Thereafter, the system determines a characteristic K from the measured values in accordance with the specified formula:

$$K = \frac{FW_2 - FW_1}{t_1 - t_0}.$$

The characteristic K is stored in the system.

The measurement operation can also be carried out in two or more stages, t1−t0 then corresponding to the total time over which irrigation has been performed. The result of the calibration measurement is used to determine the irrigation time for the following measurements.

After the measurement at the instant $t_2$, the irrigation is continued, preferably over a longer time, for example 1-2 hours, up to the instant t3. A waiting time, preferably of several hours, is inserted thereafter. A measurement is carried out anew at the instant t4. The measured value $GW_{FK}$ corresponds to the field capacity. In the case of a humus rich soil, this can be equal to GWwet. The determination of $GW_{FK}$ can also be undertaken or omitted independently of the calibration measurement.

Figure 2:
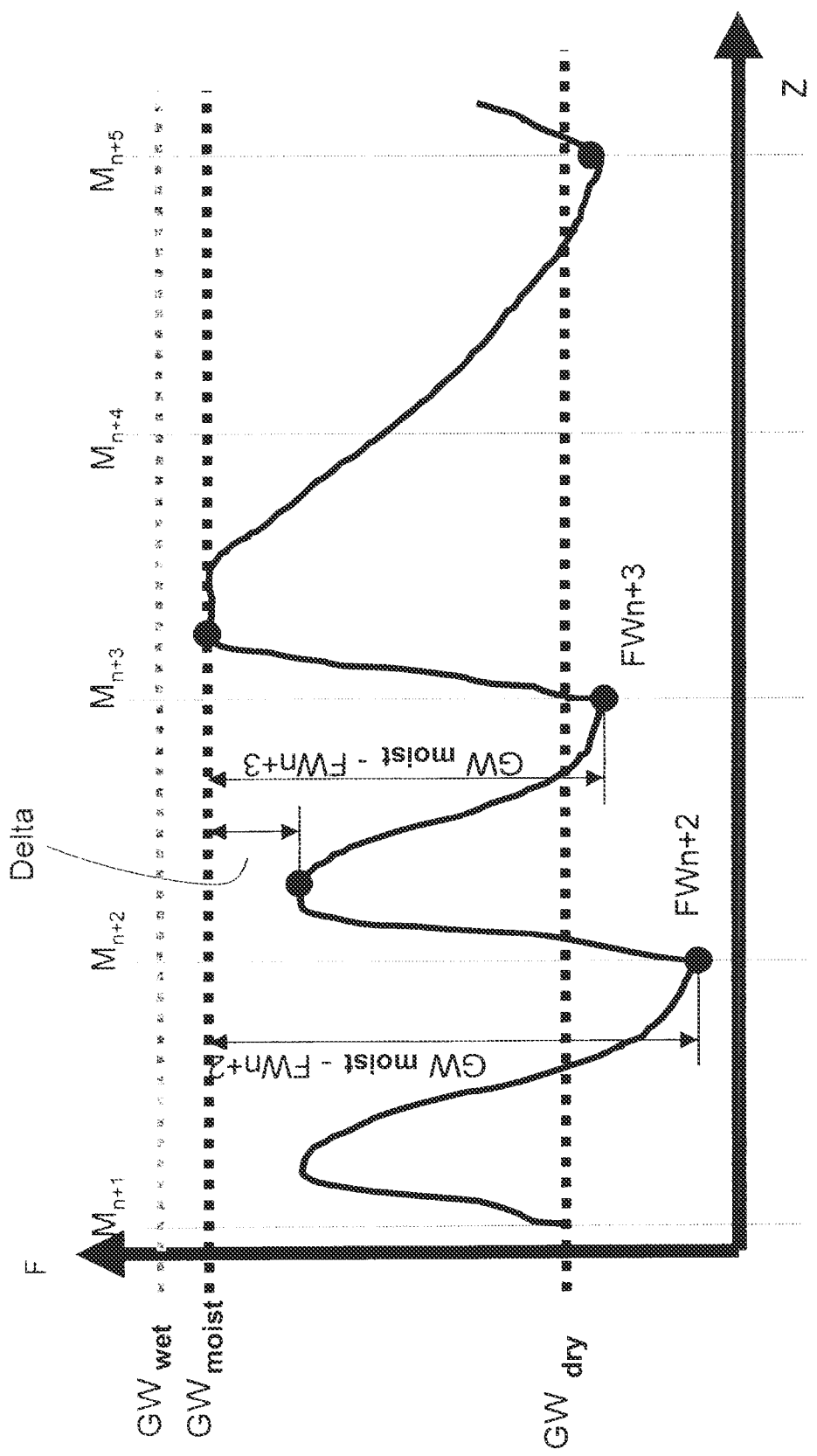
FIG. 2 shows a soil moisture profile.

FIG. 2 shows a typical profile of the soil moisture, and the principle of a continuous correction of the irrigation time in combination with a preceding calibration measurement.

After the calibration measurement, preferably in accordance with FIG. 1, the first regular measurement is carried out at the instant Mn+2. Since the current moisture value FWn+2 lies under GWdry in the example shown, an irrigation is initiated. The irrigation time BDn+2 is now calculated as follows using the measured moisture value FWn+2 and the characteristic K determined in accordance with the calibration measurement:

$$BDn+2=(GWmoist-FWn+2):K$$

After the irrigation, the moisture value is determined in turn by a control measurement. In the example shown, the intended target value GWmoist has not yet been reached (Delta >0), that is to say the irrigation time was still too short, the factor K determined in the calibration measurement too large.

The system now calculates the irrigation time BD for the following irrigation Mn+3 as follows: the difference between the target value GW and the current moisture (GWmoist FWn+2) before the measurement Mn+2 is divided by a characteristic K reduced by x. As a result, a longer duration is obtained for the subsequent irrigation at the instant Mn+3. The corresponding formula reads as follows:

$$BDn+3=(GWmoist-FWn+3):(K-x)$$

It is now assumed, in the example shown, that the target value GWmoist has been reached owing to the correction performed, and this is confirmed by a subsequent control measurement.

This would mean the target has been reached, and it is possible as shown previously to regulate further or, given conditions which are not changing, to irrigate straight away.

If GWwet has been selected as an upper moisture limit value, the problem resides in the fact that it is not known whether too much water has not been given, since the sensor cannot display a "too much". It can therefore be assumed as a precaution that too much has been poured without, however, being able to know this.

The way in which this problem is solved is preferably that whenever GWwet is reached a small negative deviation of specific magnitude is automatically adopted, and this is included in the calculation of the duration for the following irrigation. The characteristic K is enlarged in this case by a factor y.

The appropriate formula then reads as follows:

$$BDn+5=(GWwet-FWn+3):(K+y)$$

A reduction in the irrigation time via an enlargement of K can also be desired given a selected moisture limit value GWmoist, for example when the aim is to keep a watering deep on purpose, by way of example in order to save as much water as possible or to keep plants not too moist as far as possible. A multiplication factor can also be selected instead of the factors x, y that are to be subtracted and added. This factor would then be correspondingly smaller or larger than 1.

Since the moisture is still high at the instant Mn+4 in the example of FIG. 2, that is to say lies above GWdry, no irrigation is initiated. However, at the instant Mn+5, the lower limit value GWdry is undershot, and an irrigation with the calculated period BDn+5 is started.

Should there be rain between the measuring points Mn and Mn+i, this is of no consequence, since the next irrigation is only initiated once GWdry is undershot. If it begins to rain just before a measurement, the measurement is interpreted in a more or less incorrect fashion depending on the amount of rain and duration, but this is automatically corrected again in the subsequent measurement.

In conventional measurement cycles, measurements are carried out, as a rule, every few hours, for example every 3-6 hours. If a measurement cycle Mn, Mn+1, . . . is selected to be very short, however, for example every half hour, it is possible to dispense with control measurements after an irrigation since said measurements fall into the regular measurement cycle. In the case of short measurement cycles, it should be ensured that use is made of moisture sensors with a low energy consumption.

With the aid of said regulating algorithm, one is now able to set up an irrigation control which does not demand of the user any sort of knowledge relating to the nature of the soil, water input per m2 and irrigation duration. After the sensor has been placed in the soil, the system is started, calibrates itself and automatically regulates the irrigation duration so as to attain an optimum soil moisture cycle.

All that the user needs to set as a function of the plants to be irrigated are the two limit values GWdry and GWmoist. The system can be fashioned such that a table presented by the system can be used to select sensible values that are then taken over as constants.

The determination of the measurement cycles can be performed in a way similar to the timers currently available. The latter mostly permit the setting of the start time and the duration of an irrigation, it also being possible by installing a photodiode to record the day/night cycle and, correspondingly, to determine the beginning of an irrigation by day or at night. Moreover, the minimum duration between two irrigations can be defined.

In the limit case, problems can arise owing to the inflexible stipulation of the minimum duration between, for example three irrigations, for example three day cycles, that is to say irrigation every third night, by way of example. Specifically, this means when supply of water stored in the ground is insufficient in a phase of high temperature or given crops with a very high water requirement in order to meet the requirement of this time, the result being that drought stress occurs for the plants.

The regulation described here can, however, recognize such a case very easily and preferably shorten the duration between two cycles automatically. For example, if the moisture value at the time of measurement undershoots a specific critical dry limit value several times in succession, although the regulation has respectively adapted the irrigation time upwards, this is a clear indication that the irrigation cycle has been selected to be excessively long. In such a case, the system can, for example, make a report, or automatically reduce the cycle duration. It is appropriate to display or report, in particular, if an irrigation cycle is permanently prescribed in a system, for example, because of weather conditions (sun), because of use (meadow or swimming pool) or because of regulations (irrigation only at specific times). If, for example, a moisture limit value "dry" is then undershot several times, it is not permissible to increase the irrigation time on the basis of the external conditions.

LIST OF REFERENCE SYMBOLS AND FORMULAE

Mn, Mn+1 . . . Moisture measurement n, n+1, . . . at predetermined, regular time intervals t0, t1, t2 . . . Instants at which an action is initiated and stopped (for example measurement, start/stop of an irrigation, etc. . . . )

F Moisture value (of a substrate, for example, earth, lawn etc.)

FW1, FW2 First, second measured moisture value

GWdry; GWmoist Limit values "dry", "moist" that can be set $GW_{FK}$ Moisture limit value corresponding to the field capacity GWwet Fixed limit value "wet"

characteristic K=FW2−FW1/t1−t0
    System characteristic that is determined by calibration measurement and takes account of user specific details Irrigation time BD=GWmoist−FW/K
    Irrigation time calculated with the aid of measured and determined values x,y Correction factors for K for the optimized calculation of the irrigation time after an excessively short or excessively long irrigation time.

The invention claimed is:

1. A method for the regulation and control of an irrigation device, the method comprising:
    measuring soil moisture using a sensor to obtain moisture values at different instants relative to an irrigation operation; and
    performing initial calibration measurements to derive a measured moisture value (FW1) before an initial irrigation operation and a measured moisture value (FW2) after the initial irrigation operation;
    calculating an application specific characteristic K as follows:

$$K = \frac{FW_2 - FW_1}{t_1 - t_0}$$

wherein t1−t0 represents an irrigation duration between instants at which the initial calibration measurements were carried out to derive the first and second measured moisture values (FW1, FW2);
    calculating an irrigation duration for a following irrigation operation using the application specific characteristic K and evaluation electronics.

2. The method as claimed in claim 1, further comprising measuring a field capacity moisture limit value $GW_{FK}$ by completely saturating the soil with water, waiting for a waiting time sufficient for excess water to run off, and subsequently measuring the moisture value, wherein the measured moisture value corresponds to the field capacity moisture limit value $GW_{FK}$.

3. The method as claimed in claim 2, further comprising inputting a target upper moisture limit value GWmoist and generating an alarm report or replacing the target upper moisture limit value GWmoist by the field capacity moisture limit value $GW_{FK}$, if the target upper moisture limit value GWmoist lies above the field capacity moisture limit value $GW_{FK}$.

4. The method as claimed in claim 1, further comprising carrying out sequential irrigation operations, and for each sequential irrigation operation, measuring the soil moisture values before and after each irrigation operation, calculating the application specific characteristic K, and correcting the application specific characteristic K in the case of a deviation of the moisture value after an irrigation from a moisture limit value (GW).

5. The method as claimed in claim 1, further comprising calculating the irrigation duration for a subsequent irrigation operation with the aid of a characteristic K+y enlarged by an absolute value y or a characteristic K*y enlarged by a factor y>1, if the moisture value after irrigation reaches a target upper moisture limit value GWmoist that corresponds to a predetermined maximum moisture of a soil, and thereby reducing the irrigation duration for the subsequent irrigation operation.

6. The method as claimed in claim 1, further comprising calculating the irrigation duration for a subsequent irrigation operation with the aid of a characteristic K−x reduced by an absolute value x or a characteristic K*x reduced by a factor x<1, if the moisture value after irrigation does not reach a target upper moisture limit value GWmoist, and thereby increasing the irrigation duration for the subsequent irrigation operation.

7. The method as claimed in claim 1, wherein the calculated irrigation duration is enlarged or reduced by an absolute value D.

8. The method as claimed in claim 1, wherein a time between two irrigation cycles is reduced, if the measured moisture value falls below a lower moisture limit value GWdry between two irrigations, wherein GWdry corresponds to a predetermined minimum moisture of the soil.

9. An apparatus for irrigating plants having at least one sensor for measuring the soil moisture and an evaluation electronics, wherein the sensor is configured to repeatedly measure the soil moisture of the surrounding soil, and wherein the evaluation electronics is configured to store measurement parameters, wherein the apparatus is configured to be coordinated with an irrigation device in such a way that a soil moisture value (FW1) before and a soil moisture value (FW2) after an irrigation operation is measured, and the evaluation electronics is configured to calculate an irrigation duration for a following irrigation operation using an application specific characteristic K calculated as follows:

$$K = \frac{FW2 - FW1}{t1 - t0},$$

where t1−t0 represents an irrigation duration between instants at which the measurements are carried out to determine the soil moisture values (FW1, FW2).

10. The apparatus as claimed in claim 9, further comprising an electronically actuable valve for opening and closing a water supply.

11. The apparatus as claimed in claim 9, wherein the irrigation duration is checked with the aid of the evaluation electronics by comparison of measured moisture values with a predetermined target upper moisture limit value and is regulated automatically by changing the application specific characteristic K such that the moisture value after irrigation reaches the target upper moisture limit value.

12. An electronic regulation for a soil moisture sensor, wherein the electronic regulation is configured for storing measured values of the moisture sensor for deriving therefrom a time profile of soil moisture, and for calculating an irrigation duration from a soil moisture value (FW1) before and a soil moisture value (FW2) after an irrigation operation, and wherein the electronic regulation is configured to calculate an irrigation duration for a subsequent irrigation operation using an application specific characteristic K calculated as follows:

$$K = \frac{FW2 - FW1}{t1 - t0},$$

where t1−t0 represents an irrigation duration between instants at which the measurements are carried out to determine the soil moisture values (FW1, FW2).

13. The electronic regulation as claimed in claim 12, wherein the electronic regulation is configured to compare the calculated irrigation duration with a predetermined target upper moisture limit value, and, in the event of the latter being reached or exceeded, to adapt the irrigation duration by varying the application specific characteristic K.

14. The electronic regulation as claimed in claim 12 in combination with a soil moisture sensor.

15. The method as claimed in claim 1, further comprising inputting an initial value for application specific characteristic K.

16. A method for the regulation and control of an irrigation device, the method comprising:
    performing initial calibration measurements to derive a measured moisture value (FW1) before an initial irrigation operation and a measured moisture value (FW2) after the initial irrigation operation;
    calculating an application specific characteristic K as follows:

$$K = \frac{FW2 - FW1}{t1 - t0},$$

where t1−t0 represents an irrigation duration between instants at which the initial calibration measurements were carried out to derive the first and second measured moisture values (FW1, FW2);
    performing a soil irrigation operation for an irrigation duration calculated using evaluation electronics and the application specific characteristic K;
    measuring soil moisture using a sensor after the soil irrigation operation to obtain a soil moisture value; and
    comparing the measured soil moisture value with a target upper moisture limit value using the evaluation electronics and, in the event the measured soil moisture value deviates from the target upper moisture limit value, correcting the application specific characteristic K to thereby alter an irrigation duration for a subsequent soil irrigation operation.

17. An apparatus for irrigating plants having at least one sensor for measuring the soil moisture and an evaluation electronics, wherein the sensor is configured to repeatedly measure the soil moisture of the surrounding soil, and wherein the evaluation electronics is configured to store measurement parameters including application specific characteristic K, calculated as follows:

$$K = \frac{FW2 - FW1}{t1 - t0},$$

where t1−t0 represents an irrigation duration between instants at which measurements were carried out to derive first and second measured moisture values (FW1, FW2), wherein the apparatus is configured to be coordinated with an irrigation device in such a way that a measured soil moisture value obtained via the sensor after a soil irrigation operation is compared with a target upper moisture limit value by the evaluation electronics and, in the event the measured soil moisture value deviates from a target upper moisture limit value, the application specific characteristic K is corrected to thereby alter an irrigation duration for a subsequent soil irrigation operation.

18. An electronic regulation for a soil moisture sensor, wherein the electronic regulation is configured for storing measured values of the moisture sensor for deriving therefrom a time profile of soil moisture, and for calculating an irrigation duration from moisture values (FW) measured at different instants, and wherein the electronic regulation is configured to calculate an irrigation duration for subsequent irrigation operations using an application specific characteristic K calculated as follows:

$$K = \frac{FW2 - FW1}{t1 - t0},$$

where t1−t0 represents an irrigation duration between instants at which measurements were carried out to derive first and second measured moisture values (FW1, FW2), wherein the electronic regulation is configured to compare a measured soil moisture value with a target upper moisture limit value and, in the event the measured soil moisture value deviates from the target upper moisture limit value, to correct the application specific characteristic K to thereby alter an irrigation duration for a subsequent soil irrigation operation.

19. A method for the regulation and control of an irrigation device, the method comprising:
    providing an application specific characteristic K calculated as follows:

$$K = \frac{FW2 - FW1}{t1 - t0},$$

where t1−t0 represents an irrigation duration between instants at which measurements were carried out to derive first and second measured moisture values (FW1, FW2);
    calculating an irrigation duration using the application specific characteristic K;
    performing a soil irrigation operation for the calculated irrigation duration;
    measuring soil moisture using a sensor after the soil irrigation operation to obtain a measured soil moisture value;
    comparing the measured soil moisture value with a predetermined target upper moisture limit value using evaluation electronics; and
    automatically regulating an irrigation duration for a subsequent soil irrigation operation by adjusting the application specific characteristic K by means of which the irrigation duration for the subsequent soil irrigation operation is calculated, said adjustment to the application specific characteristic K being calculated to produce a moisture value obtained after the subsequent soil irrigation operation that reaches the predetermined target upper moisture limit value.

20. An apparatus for irrigating plants having at least one sensor for measuring the soil moisture and an evaluation electronics, wherein the sensor is configured to repeatedly measure the soil moisture of the surrounding soil, and wherein the evaluation electronics is configured to store measurement parameters including application specific characteristic K, calculated as follows:

$$K = \frac{FW2 - FW1}{t1 - t0},$$

where t1−t0 represents an irrigation duration between instants at which measurements were carried out to derive first and second measured moisture values (FW1, FW2), wherein the apparatus is configured to be coordinated with an irrigation device in such a way that an irrigation duration for a subsequent soil irrigation operation is automatically regulated by adjusting the application specific characteristic K by means of which the irrigation duration for the subsequent soil irrigation operation is calculated, said adjustment to the application specific characteristic K being calculated to produce a moisture value obtained after the subsequent soil irrigation operation that reaches a predetermined target upper moisture limit value.

21. An electronic regulation for a soil moisture sensor, wherein the electronic regulation is configured for storing measured values of the moisture sensor for deriving therefrom a time profile of soil moisture, and for calculating an irrigation duration from moisture values (FW) measured at different instants and for calculating an application specific characteristic K as follows:

$$K = \frac{FW2 - FW1}{t1 - t0},$$

where t1−t0 represents an irrigation duration between instants at which measurements were carried out to derive first and second measured moisture values (FW1, FW2), and wherein the electronic regulation is configured to be coordinated with an irrigation device in such a way that the irrigation duration for a subsequent soil irrigation operation is automatically regulated by adjusting the application specific characteristic K by means of which the irrigation duration for the subsequent soil irrigation operation is calculated, said adjustment to the application specific characteristic K being calculated to produce a moisture value obtained after the subsequent soil irrigation operation that reaches a predetermined target upper moisture limit value.

* * * * *